(12) United States Patent
Gao et al.

(10) Patent No.: US 12,387,102 B2
(45) Date of Patent: Aug. 12, 2025

(54) METHOD AND DEVICE FOR DETERMINING TASK-DRIVEN PRUNING MODULE, AND COMPUTER READABLE STORAGE MEDIUM

(71) Applicant: PEKING UNIVERSITY SHENZHEN GRADUATE SCHOOL, Shenzhen (CN)

(72) Inventors: Wei Gao, Shenzhen (CN); Yang Guo, Shenzhen (CN); Ge Li, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 784 days.

(21) Appl. No.: 17/681,243

(22) Filed: Feb. 25, 2022

(65) Prior Publication Data

US 2023/0186091 A1 Jun. 15, 2023

Related U.S. Application Data

(63) Continuation of application No. PCT/CN2021/136849, filed on Dec. 9, 2021.

(51) Int. Cl.
*G06N 3/082* (2023.01)
(52) U.S. Cl.
CPC .................................. *G06N 3/082* (2013.01)
(58) Field of Classification Search
CPC ....................................................... G06N 3/082
See application file for complete search history.

(56) References Cited

U.S. PATENT DOCUMENTS

| | | | | |
|---|---|---|---|---|
| 9,569,729 | B1 * | 2/2017 | Oehrle | G06Q 10/063 |
| 2021/0295174 | A1 * | 9/2021 | Zhang | G06N 3/082 |
| 2022/0004803 | A1 * | 1/2022 | Li | G06T 19/006 |

(Continued)

FOREIGN PATENT DOCUMENTS

| | | |
|---|---|---|
| CN | 112488297 A | 3/2021 |
| CN | 112949840 A | 6/2021 |

(Continued)

OTHER PUBLICATIONS

International Search Report and Written Opinion issued in corresponding PCT Application No. PCT/CN2021/136849, dated Aug. 25, 2022.

(Continued)

*Primary Examiner* — Beau D Spratt
(74) *Attorney, Agent, or Firm* — Westbridge IP LLC (57) ABSTRACT

A method for determining a task-driven pruning module includes: obtaining an input task and a task quantity of a neural network to be pruned, and output information of a component module of the neural network to be pruned; determining a task correlation degree of the component module according to the input task, the task quantity and the output information; determining an input information retention degree of the component module according to the task quantity and the output information; determining an importance index value of the component module according to the task correlation degree and the input information retention degree; and determining the pruning module in the neural network to be pruned according to the importance index value.

8 Claims, 5 Drawing Sheets

(56) References Cited

U.S. PATENT DOCUMENTS

2022/0036194 A1* 2/2022 Sundaresan ............ G06N 3/063
2022/0253708 A1* 8/2022 Tamada ................ G06F 18/214

FOREIGN PATENT DOCUMENTS

| CN | 113077039 A | 7/2021 |
| CN | 113240111 A | 8/2021 |
| CN | 113255910 A | 8/2021 |
| CN | 113516638 A | 10/2021 |
| WO | 2021195643 A1 | 9/2021 |

OTHER PUBLICATIONS

Alqahtani et al., Pruning CNN filters via quantifying the importance of deep visual representations, Computer Vision and Image Understanding, vol. 208-209, No. 7, pp. 1-15, dated Jul. 31, 2021.
Bau et al., Network Dissection: Quantifying Interpretability of Deep Visual Representations, 2017 IEEE Conference on Computer Vision and Pattern Recognition, pp. 3319-3327, dated Apr. 19, 2017.
First Office Action issued in counterpart Chinese Patent Application No. 202180003874.0, dated Feb. 28, 2025.
Li et al., Exploiting Kernel Sparsity and Entropy for Interpretable CNN Compression, 2019 IEEE/CVF Conference on Computer Vision and Pattern Recognition (CVPR), pp. 2795-2804, dated Apr. 1, 2019.
Lohscheller, A Subjectively Adapted Image Communication System, IEEE Transactions on Communications, vol. Com-32, No. 12, pp. 1316-1322, dated Dec. 31, 1984.
Zhong, Research and Application of Neural Network Model Compression Based on Weight Pruning, Master's Thesis submitted to University of Electronic Science and Technology of China, dated Aug. 28, 2020.

* cited by examiner

METHOD AND DEVICE FOR DETERMINING TASK-DRIVEN PRUNING MODULE, AND COMPUTER READABLE STORAGE MEDIUM

CROSS-REFERENCE TO RELATED APPLICATIONS

This application is a continuation application of International Application No. PCT/CN2021/136849, filed on Dec. 9, 2021, the entire disclosure of which is incorporated herein by reference.

TECHNICAL FIELD

The present disclosure relates to the technical field of neural network compression, and in particular, to a method and a device for determining a task-driven pruning module, and a computer readable storage medium.

BACKGROUND

The neural network has made major breakthroughs in many fields such as computer vision and natural language processing. However, in the specific application process, the computational complexity and parameter storage requirements of the neural network are relatively high, so that the neural network cannot be deployed on some devices with limited resources. In order to expand the applicable scope of the neural network, the neural network can usually be compressed by means of neural network pruning, and the computational complexity and parameter storage requirements of the neural network can be reduced.

However, the existing neural network pruning schemes usually evaluate the importance of different parts of the network structure based on weight parameters in the neural network or data features of the output feature map, and then perform pruning operations according to the importance. In this way, when evaluating the importance of different parts of the network structure based on data-driven, only the characteristics of the output data itself are considered, resulting in the pruning accuracy when pruning is performed according to the evaluated importance to be further improved.

SUMMARY

The present disclosure provides a method and a device for determining a task-driven pruning module, and a computer readable storage medium, which aims to solve the technical problem that when evaluating the importance of different parts of the network structure based on data-driven, only the characteristics of the output data itself are considered, resulting in the pruning accuracy when pruning is performed according to the evaluated importance to be further improved.

The present disclosure provides a method for determining a task-driven pruning module, including following operations:
  obtaining an input task and a task quantity of a neural network to be pruned, and output information of a component module of the neural network to be pruned;
  determining a task correlation degree of the component module according to the input task, the task quantity and the output information;
  determining an input information retention degree of the component module according to the task quantity and the output information;
  determining an importance index value of the component module according to the task correlation degree and the input information retention degree; and
  determining the pruning module in the neural network to be pruned according to the importance index value.

In an embodiment, the operation of determining a task correlation degree of the component module according to the input task, the task quantity and the output information includes:
  obtaining a target serial number of the component module in a current network level;
  determining a target component module whose serial number is less than or equal to the target serial number in the current network level;
  determining an input task retention degree and a sum of input and output information of each target component module according to output information of each target component module and the input task; and
  determining the task correlation degree of the component module according to the task quantity, the input task retention degree and the sum of the input and output information.

In an embodiment, the input task includes at least one input task map, the output information includes an output feature map, and the operation of determining an input task retention degree and a sum of input and output information of each target component module according to output information of each target component module and the input task includes:
  adjusting a resolution of the output feature map of each target component module, so that the resolution of the output feature map is consistent with a resolution of the input task map;
  binarizing the input task map and the adjusted output feature map;
  obtaining the input task retention degree of each target component module through taking an intersection of the processed input task map and the processed output feature map; and
  obtaining the sum of the input and output information of each target component module through taking a union of the processed input task map and the processed output feature map.

In an embodiment, the operation of determining the task correlation degree of the component module according to the task quantity, the input task retention degree and the sum of the input and output information includes:
  obtaining a ratio of the input task retention degree and the sum of the input and output information, and obtaining a task retention ratio of each target component module;
  summing each task retention ratio to obtain a sum of the task retention ratio; and
  determining a quotient of the sum of the task retention ratio and the task quantity as the task correlation degree of the component module.

In an embodiment, the operation of determining an input information retention degree of the component module according to the task quantity and the output information includes:
  obtaining a target serial number of the component module in a current network level, and an image quantity in the input task;

determining a target component module whose serial number is less than or equal to the target serial number in the current network level;

determining a first energy value of each target component module in the current network level according to output information of each target component module, and determining a second energy value of the component module in a previous network level according to output information of each component module in the previous network level; and determining the input information retention degree of the component module according to the task quantity, the first energy value and the second energy value.

In an embodiment, the operation of determining a first energy value of each target component module in the current network level according to output information of each target component module, and determining a second energy value of the component module in a previous network level according to output information of each component module in the previous network level includes:

obtaining a norm of the output information of each target component module, and using a square of the norm as the first energy value of each target component module; and obtaining a variance of the output information of each component module in the previous network level to obtain the second energy value.

In an embodiment, the operation of determining the input information retention degree of the component module according to the task quantity, the first energy value and the second energy value includes:

obtaining a ratio of each first energy value and each second energy value, and obtaining an energy ratio corresponding to each target component module;

summing each energy ratio to obtain a sum of the energy ratio; and determining a quotient of the sum of the energy ratio and the task quantity as the input information retention degree of the component module.

In an embodiment, the operation of determining an importance index value of the component module according to the task correlation degree and the input information retention degree includes:

normalizing the task correlation degree and the input information retention degree;

taking a sum of the normalized task correlation degree and the normalized input information retention degree as the importance index value of the component module; or taking a product of the normalized task correlation degree and the normalized input information retention degree as the importance index value of the component module.

Besides, in order to achieve the above objective, the present disclosure further provides a device for determining a task-driven pruning module, including a memory, a processor, and a program for determining the task-driven pruning module stored in the memory and executable on the processor, wherein when the program is executed by the processor, the operations of the method for determining the task-driven pruning module as described above are implemented.

Besides, in order to achieve the above objective, the present disclosure further provides a computer readable storage medium, wherein a program for determining a task-driven pruning module is stored in the computer readable storage medium, and when the program is executed by a processor, the operations of the method for determining the task-driven pruning module as described above are implemented.

The present disclosure provides a method and a device for determining a task-driven pruning module, and a computer readable storage medium, and the method includes: obtaining an input task and a task quantity of a neural network to be pruned, and output information of a component module of the neural network to be pruned; determining a task correlation degree of the component module according to the input task, the task quantity and the output information; determining an input information retention degree of the component module according to the task quantity and the output information; determining an importance index value of the component module according to the task correlation degree and the input information retention degree; and determining the pruning module in the neural network to be pruned according to the importance index value. As such, the output information of each component module can be associated with the input task to realize task-driven neural network pruning, which can avoid that the important modules associated with the input task are easily pruned when the importance evaluation of each component module is performed only according to the data characteristics of the output data itself to affect the processing of the input task by the neural network. Furthermore, the accuracy of the determination of the pruning module can be improved, so as to improve the pruning accuracy of the neural network.

The realization of the objective, functional characteristics, and advantages of the present disclosure are further described with reference to the accompanying drawings.

DETAILED DESCRIPTION OF THE EMBODIMENTS

For better understanding of the above technical solutions, exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided so that the present disclosure will be more thoroughly understood, and will fully convey the scope of the present disclosure to those skilled in the art.

The main solutions of the present disclosure are: obtaining an input task and a task quantity of a neural network to be pruned, and output information of a component module of the neural network to be pruned; determining a task correlation degree of the component module according to the input task, the task quantity and the output information; determining an input information retention degree of the component module according to the task quantity and the output information; determining an importance index value of the component module according to the task correlation degree and the input information retention degree; and determining the pruning module in the neural network to be pruned according to the importance index value.

Since most of the current neural network pruning schemes are based on data-driven implementation of the importance evaluation of each component module, however, in this way, only the data characteristics of the output data itself are considered, while the association between the output data and the input task is ignored. As a result, the component modules related to the input task are easily pruned during pruning, which is not conducive to improving the accuracy of pruning. Therefore, the above solution proposed in the present disclosure aims to improve the accuracy of pruning.

Figure 1:
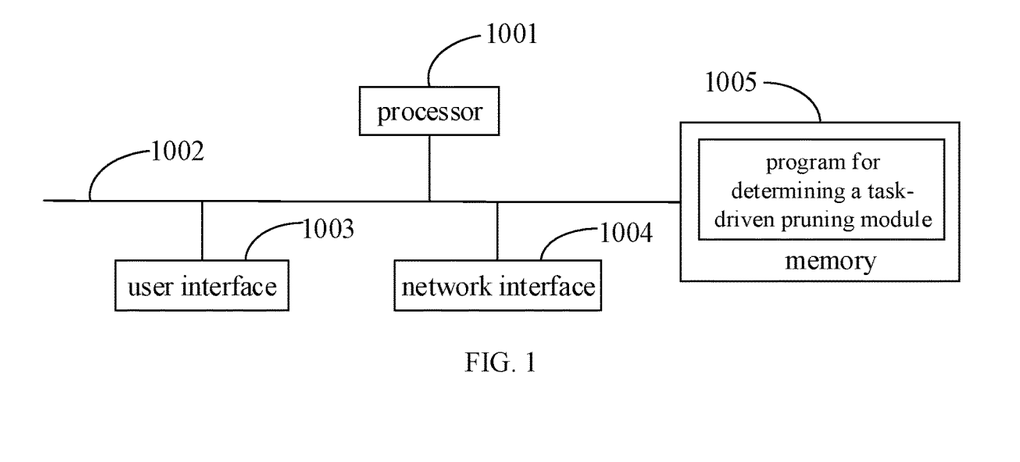
FIG. 1 is a schematic structural diagram of a device for determining a task-driven pruning module in a hardware operating environment according to an embodiment of the present disclosure.

As shown in FIG. 1, FIG. 1 is a schematic structural diagram of a device for determining a task-driven pruning module in a hardware operating environment according to an embodiment of the present disclosure.

The device for determining the task-driven pruning module can include a communication bus 1002, a processor 1001, such as a CPU, a user interface 1003, a network interface 1004, and a memory 1005. The communication bus 1002 is configured to implement communication between the components. The user interface 1003 can include a display, an input unit such as a keyboard. The user interface 1003 can also include a standard wired interface and a wireless interface. The network interface 1004 can include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

Those skilled in the art should understand that the structure of the device for determining the task-driven pruning module shown in FIG. 1 does not constitute a limitation on the device, and can include more or fewer components, a combination of some components, or differently arranged components than shown in the figure.

In the device shown in FIG. 1, the network interface 1004 is mainly configured to connect to a background server and perform data communication with the background server. The user interface 1003 is mainly configured to connect to a client (user) and perform data communication with the client. The processor 1001 can be configured to call the program for determining the task-driven pruning module stored in the memory 1005, and perform the operations of the method for determining the task-driven pruning module in each embodiment.

Figure 2:
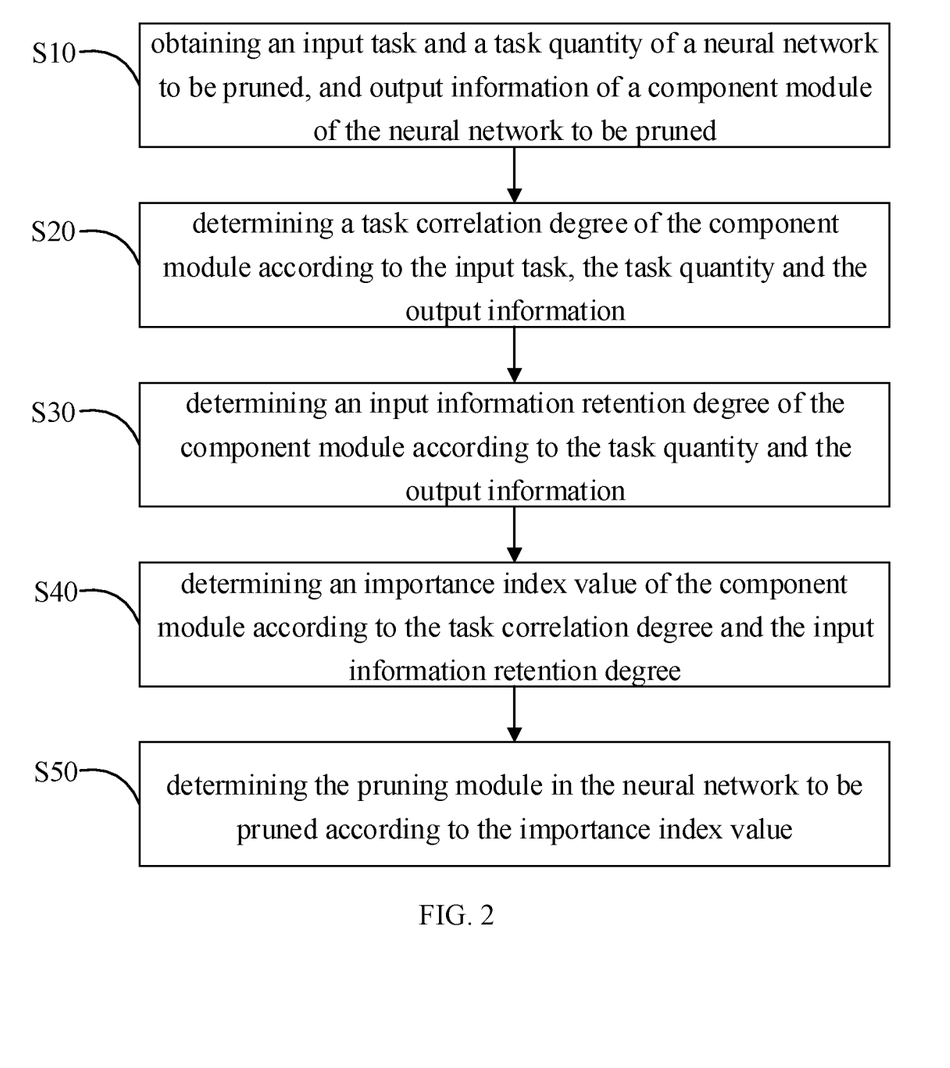
FIG. 2 is a schematic flowchart of a method for determining a task-driven pruning module according to a first embodiment of the present disclosure.

Based on the system architecture of the above device for determining a task-driven pruning module, a first embodiment of a method for determining a task-driven pruning module of the present disclosure is proposed. As shown in FIG. 2, in this embodiment, the method for determining a task-driven pruning module includes the following operations.

Operation S10, obtaining an input task and a task quantity of a neural network to be pruned, and output information of a component module of the neural network to be pruned;

Operation S20, determining a task correlation degree of the component module according to the input task, the task quantity and the output information;

Operation S30, determining an input information retention degree of the component module according to the task quantity and the output information;

Operation S40, determining an importance index value of the component module according to the task correlation degree and the input information retention degree; and Operation S50, determining the pruning module in the neural network to be pruned according to the importance index value.

It should be note that the neural network to be pruned refers to the neural network that needs to be pruned to achieve neural network compression, such as Convolutional Neural Network (CNN), Deep Neural Network (DNN), Recurrent Neural Network (RNN), or the like. The input task of the neural network to be pruned refers to the input data that is input to the neural network to be pruned for information processing, such as a data table, a sequence table, or an image table, or the like. The output information of the component module of the neural network to be pruned refers to the output data of the component module of the neural network to be pruned, such as the output feature map. Each neural network to be pruned can include multiple component modules, the component module can include at least one of filter, channel, and parameter, and each input task can include at least one input data, such as at least one input image, or the like.

Due to the high computational complexity and parameter storage requirements of the neural network, in order to improve the processing efficiency and expand the applicable scope of the neural network, the neural network needs to be compressed, and the neural network pruning is a commonly used neural network compression method at present. However, in some implementations, the importance assessment of the components of the neural network is usually based on data-driven. For example, based on the L1 regularization, or L2 regularization or other regularization terms of the output feature map of the calculation channel, the degree of importance is determined by the numerical ranking of the calculation results. Or, the degree of importance is determined by sorting all the elements in each weight parameter matrix according to the absolute value from small to large. Or, the contribution of the filter is determined by calculating the norm of the filter (L1 regularization/L2 regularization/other regularization terms), and the norm is proportional to the contribution. Thus, when evaluating the importance of different components in the network structure, only the output characteristics of the output data itself are considered, while the connection between the output data and the input task is ignored, resulting in the pruning accuracy when pruning is performed according to the evaluated importance to be further improved. Therefore, the method for determining the task-driven pruning module proposed by the present disclosure can combine the relationship between the output data of each component module and the input task to evaluate the importance of the neural network to be pruned, to more accurately determine the pruning module in the component modules of the neural network to be pruned, thereby improving the pruning accuracy when the neural network to be pruned is pruned.

Specifically, after inputting the input task into the neural network to be pruned, the output information of each component module of the neural network to be pruned can be obtained, and the input task input to the neural network to be pruned and the task quantity corresponding to the input task are recorded, to determine the importance of each component module of the neural network to be pruned according to the input task and the task quantity of the neural network to be pruned and the output information of the component module of the neural network to be pruned.

The operation of determining the importance of each component module of the neural network to be pruned includes: determining the task correlation degree of each component module according to the input task and the task quantity of the neural network to be pruned and the output information of the component module of the neural network to be pruned; and determining the input information retention degree of each component module according to the task quantity of the neural network to be pruned and the output information of each component module of the neural network to be pruned. Then, the importance index value of each component module is determined according to the task correlation degree and the input information retention degree of each component module. The task correlation degree of each component module refers to the correlation degree between the output information of each component module and the input task of the neural network to be pruned. The input information retention degree of each component module refers to the information amount of the input information contained in the output information of each component module.

Alternatively, when determining the task correlation degree of each component module according to the input task and the task quantity of the neural network to be pruned and the output information of the component module of the neural network to be pruned, the influence of information transmission between the component modules of the same network level is considered, which can take the intersection of the input task of the neural network to be pruned and the output information of the first N component modules including the current component module N (N is a positive integer) in the current network level, to obtain the amount of input task information contained in the first N component modules, sum the amount of input task information contained in the first N component modules, and then average the summed values according to the task quantity to obtain the task correlation degree corresponding to the current component module N. Or, after determining the intersection and union of the output information of each component module and the input task, according to the serial number N of the current component module in the current network level, the ratio of the intersection and union corresponding to the first N component modules is summed, then, the sum value obtained by the summation is averaged according to the task quantity, so as to obtain the task correlation degree corresponding to the current component module.

It can be understood that the manner of determining the task correlation degree of each component module can also be other manners, which are only listed here, and is not specifically limited.

Alternatively, the input information retention degree of each component module is determined according to the task quantity of the neural network to be pruned and the output information of each component module of the neural network to be pruned, the influence between the component modules of the same network level is considered. After determining the energy value corresponding to the output information of the first N component modules including the current component module N (N is a positive integer) in the current network level, and summing the determined N energy values, it is possible to average the summed values according to the task quantity to obtain the input information retention amount of the current component module. Or, considering the flow of information between adjacent network levels and the interaction between component modules of the same network level, after determining the energy ratio corresponding to the output information of each component module and the output information of the previous network level, the energy ratio corresponding to the first N component modules is summed according to the serial number N of the current component module in the current network level, and the average value is obtained according to the task quantity to obtain the input information retention of the current component module, or the like.

It can be understood that the manner of determining the input information retention degree of each component module can also be other manners, which are only listed herein, and is not specifically limited.

Alternatively, when determining the importance index value of each component module according to the task correlation degree and the input information retention degree of each component module, specifically, it can be taking a sum of the task correlation degree and the input information retention as the importance index value; or taking a product of the task correlation degree and the input information retention as the importance index value, or taking a weighted sum of the task correlation degree and the input information retention degree as the importance index value, or the like, which is not specifically limited herein.

After determining the importance index value of each component module, the pruning module in the neural network to be pruned can be determined according to the importance index value. The pruning module in the neural network to be pruned refers to a component module that can be pruned among the component modules of the neural network to be pruned, such as at least one of a filter, a channel, and a parameter. After the pruning module in the neural network to be pruned is determined, the pruning module can be pruned to reduce the computational complexity and data storage requirements of the neural network to be pruned.

Alternatively, the manner of determining the pruning module in the neural network to be pruned according to the importance index value may be: determining the component module whose importance index value is within the preset value range as the pruning module. Alternatively, after determining the number of pruning modules to be pruned according to the preset pruning rate, a component module with a higher importance index value corresponding to the number of pruning modules is determined as a pruning module, or the like, which is not specifically limited here. The preset value range and the preset pruning rate can be set according to actual needs, and are not specifically limited here.

In this embodiment, the input task and the task quantity of the neural network to be pruned, and the output information of the component module of the neural network to be pruned are obtained; the task correlation degree of the component module is determined according to the input task, the task quantity and the output information; the input information retention degree of the component module is determined according to the task quantity and the output information; the importance index value of the component module is determined according to the task correlation degree and the input information retention degree; and the pruning module in the neural network to be pruned is determined according to the importance index value. As such, the output information of each component module can be associated with the input task of the neural network to be pruned to evaluate the importance of each component module based on the task drive, to avoid the importance evaluation based on the data characteristics of the output data itself and ignore the role of the input task in the information processing of the neural network, which is easy to prune the component modules with high correlation with the input task by mistake, and will affect the processing of the input task. In this way, by associating the output information of each component module with the input task of the neural network to be pruned, evaluating the importance of each component module based on the task drive can improve the pruning accuracy of the neural network to be pruned.

Figure 3:
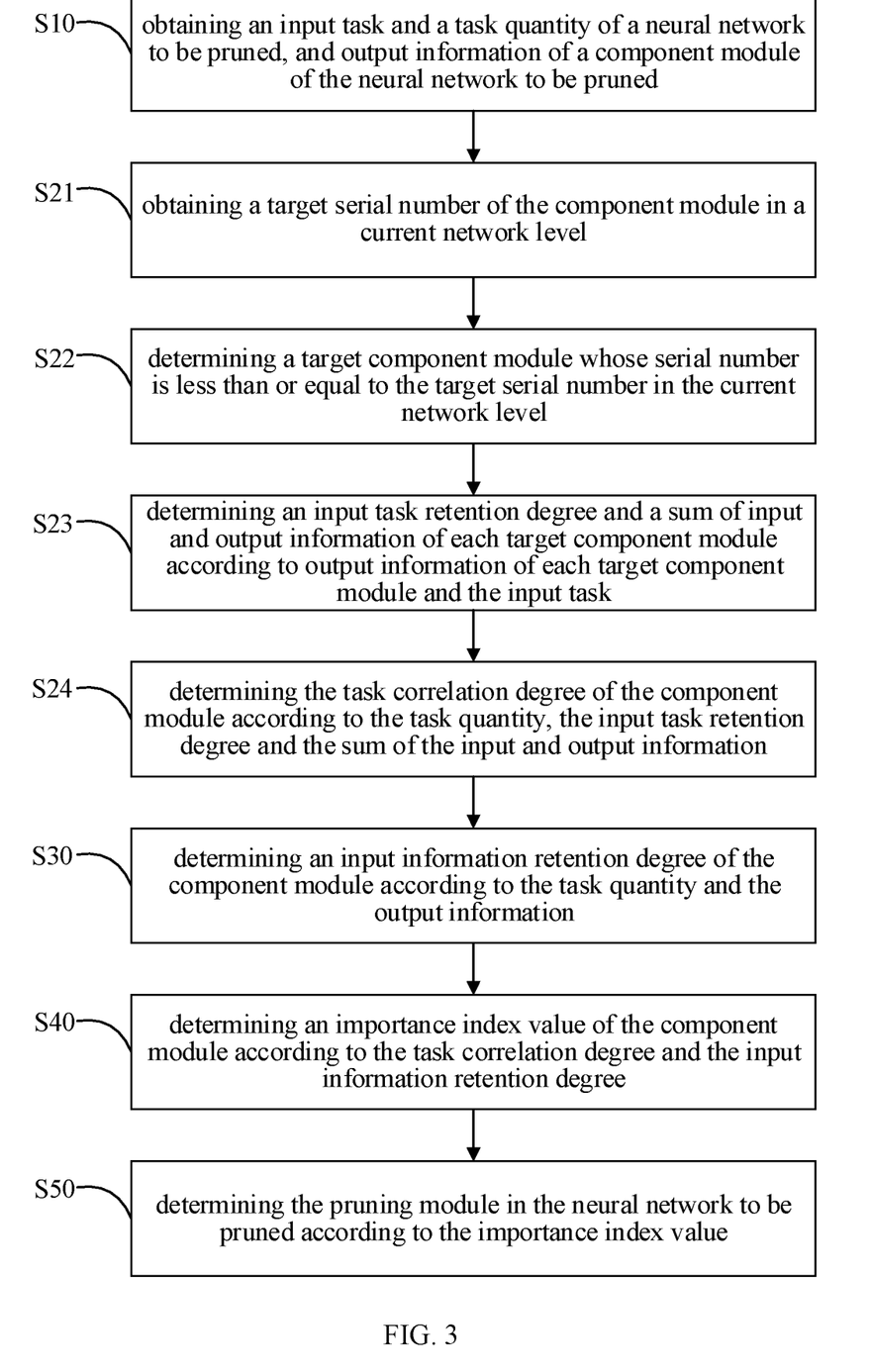
FIG. 3 is a schematic flowchart of the method for determining the task-driven pruning module according to a second embodiment of the present disclosure.

Based on the above first embodiment, a second embodiment of the method for determining the task-driven pruning module of the present disclosure is proposed. As shown in FIG. 3, in this embodiment, the operation S20 can include:

Operation S21, obtaining a target serial number of the component module in a current network level;

Operation S22, determining a target component module whose serial number is less than or equal to the target serial number in the current network level;

Operation S23, determining an input task retention degree and a sum of input and output information of each target component module according to output information of each target component module and the input task; and Operation S24, determining the task correlation degree of the component module according to the task quantity, the input task retention degree and the sum of the input and output information.

It should be noted that the neural network to be pruned can include multiple network levels, and each network level can include multiple component modules. Based on this, different component modules in the same network level can be numbered based on the connection relationship or processing order of each component module, so as to facilitate the differentiation of different component modules in the same network level. For example, it can be sorted in descending order according to the connection relationship; or, it can be sorted in ascending order according to the processing order. The higher the processing order, the smaller the corresponding sorting serial number.

Since there will be mutual influence between the component modules at the same level, which will affect the task correlation degree of the current component module, before determining the task correlation degree of the current component module, the target component module that has an impact on the information processing of the current component module in the current network level can be determined first, then, the task correlation degree of the current component module is determined by combining the influence of the target component module and the processing capability of the current component module itself. Specifically, the target serial number of the current component module in the current network level where it is located may be determined first, for example, the current filter is the number of component modules in the current network level. The component module whose sorting serial number is smaller than the target serial number is considered to be the component module that may have an impact on the task correlation degree of the current component module. In this way, the component module whose serial number is less than or equal to the target serial number in the current network level can be determined as the target component module. For example, when the target serial number is 1, the first component module is determined as the target component module. When the target serial number is 3, the first, second and third component modules are all determined as target component modules. Furthermore, the task correlation degree of the current component module can be determined according to the output information of the target component module and the input task and the task quantity of the neural network to be pruned.

Specifically, when determining the task correlation degree of the current component module, the input task retention degree of each target component module and the sum of the input and output information of each target component module can be determined according to the output information of each target component module and the input task of the neural network to be pruned. Then, the task correlation degree of the current component module is determined according to the task quantity input to the neural network to be pruned, the input task retention degree and the sum of input and output information of each target component module. The input task retention degree of each target component module refers to the information amount of the input task contained in the output information of each target component module. The sum of the input and output information of each target component module refers to the sum of the output information of each target component module and the task information contained in the input task of the neural network to be pruned.

Alternatively, the operation of determining the input task retention degree of each target component module and the sum of input and output information according to the output information of each target component module and the input task of the neural network to be pruned includes: taking the intersection of the output information of the target component module and the input task of the neural network to be pruned to obtain the input task retention of each target component module; and unioning the output information of the target component module and the input task of the neural network to be pruned to obtain the sum of the input and output information of each target component module.

Alternatively, when the input task takes image classification as an example, if the input task of the neural network to be pruned includes at least one input task map, correspondingly, the output information of each component module includes at least one output feature map. In order to facilitate information comparison, before determining the input task retention of each target component module and the sum of input and output information, first, the resolution of the output feature map of each target component module is adjusted to adjust the resolution of the output feature map to be consistent with the resolution of the input task map.

In order to reduce the amount of computation and highlight the outline of the target of interest, before determining the input task retention of each target component module and the sum of input and output information, the output feature map and input task map can also be binarized.

The operation of determining the task correlation degree of the component module according to the task quantity of the neural network to be pruned, the input task retention degree of each target component module and the sum of the input and output information includes: obtaining a ratio of the input task retention degree and the sum of the input and output information, and obtaining a task retention ratio of each target component module; summing each task retention ratio to obtain a sum of the task retention ratio; and determining a quotient of the sum of the task retention ratio and the task quantity as the task correlation degree of the component module.

In a specific application example, the resolution adjustment of the output feature map of each target component module can be performed first, so as to adjust the resolution of the output feature map to be consistent with the resolution of the input task map. Then, the input task map is binarized to obtain the input task map after binarization. The adjusted output feature map is binarized to obtain the output feature map after binarization. Then, the intersection of the input task map after binarization processing and the output feature map after binarization processing is taken to obtain the input task retention degree of each target component module. The union of the input task map after binarization processing and the output feature map after binarization processing is taken to obtain the sum of the input and output information of each target component module. Next, it is possible to obtain the ratio of the input task retention degree of each target component module to the sum of the input and output information, and obtain the task retention ratio of each target component module; and sum the obtained task retention ratio to obtain the sum of the task retention ratio of each target component module. Then, by calculating the quotient of the sum of the task retention ratio of each target component module and the task quantity, the task correlation degree of the current component module can be obtained.

For example, for the i-th component module of the t-th layer in the neural network to be pruned, suppose that the grayscale map of the input task map x is denoted as G(x), the weight parameter of the i-th component module of the t-th layer in the network is $W_t^i$, and the corresponding output feature map is denoted as $O_t^i(x)$. Then, calculating the task correlation degree of the i-th component module of the t-th layer in the neural network to be pruned can include the following operations.

1) The resolution of $O_t^i(x)$ can be adjusted to be the same as the resolution of the input task map x by bilinear interpolation, and the adjusted output feature map is denoted as $\tilde{O}_t^i(x)$.

2) Based on the preset threshold Δ, G(x) and $\tilde{O}_t^i(x)$ can be binarized to obtain the input task map after binarization, denoted as L(x). The output feature map after binarization is denoted as $M_t^i(x)$. The calculation formula is as follows:

$$L(x):=G(x)>\Delta, M_t^i(x):=\tilde{O}_t^i(x)>\Delta \quad (1)$$

It is worth noting that the difference in the preset threshold Δ will not affect the final calculated importance index value.

3) If the task retention ratio of each target component module whose serial number is less than or equal to i is denoted as $A_t^i(x)$, the average value of $A_t^i(x)$ is taken according to the task quantity d to obtain the task correlation degree of the i-th component module of the t-th layer in the neural network to be pruned, which is denoted as $A_t^i$.

The calculation formula is as follows:

$$A_t^i = \frac{1}{d}\sum A_t^i(x) = \frac{1}{d}\sum \frac{L(x) \cap M_t^i(x)}{L(x) \cup M_t^i(x)} \quad (2)$$

It should be noted that the larger the $A_t^i$, the stronger the ability of the i-th component module of the t-th layer in the network to extract the semantic information of the input task, and the more important for the input task. That is, each component module can be regarded as a semantic extractor related to the input task, and the output feature map of each component module can be regarded as a feature map containing the semantic information of the input task. By determining how much semantic information related to the input task is contained in the output feature map, the relationship between the input task and the feature map is evaluated, so as to determine the semantic extraction ability of the filter outputting the feature map for the task.

In this embodiment, the task correlation degree of the current component module is determined through the task quantity corresponding to the input tasks of the neural network to be pruned, the input task retention degree of the target component module and the sum of the input and output information, which can not only associate the output information of the current component module with the input task, but also fully consider the impact of the top-ranked component modules in the current network level on the task correlation degree of the current component module. Thus, the accuracy of determining the task correlation degree of the current component module can be improved, thereby improving the accuracy of determining the importance index value of the current component module, so as to improve the accuracy of pruning.

Figure 4:
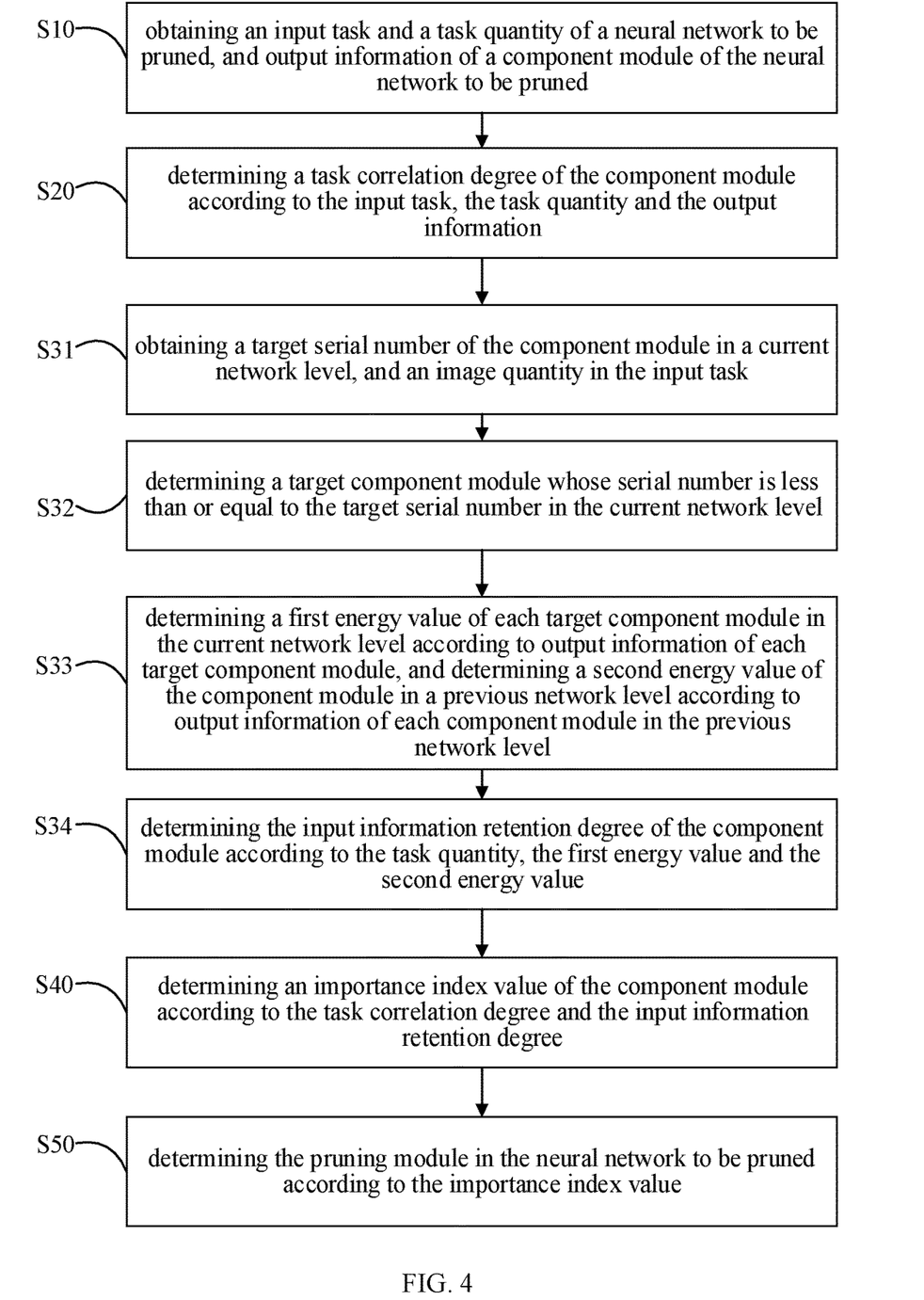
FIG. 4 is a schematic flowchart of the method for determining the task-driven pruning module according to a third embodiment of the present disclosure.

Based on the above first embodiment, a third embodiment of the method for determining the task-driven pruning module of the present disclosure is proposed. As shown in FIG. 4, in this embodiment, the operation S30 can include:

Operation S31, obtaining a target serial number of the component module in a current network level, and an image quantity in the input task;

Operation S32, determining a target component module whose serial number is less than or equal to the target serial number in the current network level;

Operation S33, determining a first energy value of each target component module in the current network level according to output information of each target component module, and determining a second energy value of the component module in a previous network level according to output information of each component module in the previous network level; and Operation S34, determining the input information retention degree of the component module according to the task quantity, the first energy value and the second energy value.

It should be noted that the neural network to be pruned can include multiple network levels, and each network level can include multiple component modules. Based on this, different component modules in the same network level can be numbered based on the connection relationship or processing order of each component module, so as to facilitate the differentiation of different component modules in the same network level. For example, it can be sorted in descending order according to the connection relationship; or, it can be sorted in ascending order according to the processing order. The higher the processing order, the smaller the corresponding sorting serial number.

Since there is mutual influence between the component modules at the same level, and there is no mutual influence between the component modules at different levels, the flow of information in the component modules of adjacent layers can be measured by analyzing the amount of information acquisition between component modules of adjacent layers to evaluate the input information retention degree of the current component module. Specifically, before determining the input information retention degree of the current component module, a target component module in the current network level that has an impact on the input information retention degree of the current component module can be determined first. For example, the target serial number in the current network level where the current component module is located can be determined first, for example, the current filter is the number of filters in the current network level. The component module whose sorting serial number is smaller than the target serial number is considered to be the target component module that has an influence on the input information retention degree of the current component module. In this way, the component module whose serial number is less than or equal to the target serial number in the current network level can be determined as the target component module. Further, the input information retention degree of the current component module can be determined according to the output information of the target component module and the task quantity corresponding to the input task of the neural network to be pruned.

The operation of determining the input information retention degree of the current component module according to the output information of the target component module and the task quantity of the neural network to be pruned includes: determining the first energy value of each target component module in the current network level according to the output information of each target component module; determining the second energy value of the component modules in the previous network level according to the output information of each component module in the previous network level; determining the input information retention degree of the current component module according to the task quantity, the first energy value and the second energy value. The first energy value refers to the energy value corresponding to the output information of each target component module, and the second energy value refers to the energy value corresponding to the output information of the previous network level.

The norm of the output information of each target component module can be obtained, and the square of the obtained norm can be used as the first energy value of each target component module. The norm herein especially refers to the L2 norm, so as to improve the accuracy of calculating the first energy value. In some other embodiments, other norms, such as the L1 norm, can also be used, which are not specifically limited herein. The L2 norm refers to performing the square root to the sum of the squares of each element in the vector; the L1 norm refers to the sum of the absolute value of each element in the vector, also known as the "sparse rule operator".

The variance of the output information of each component module in the previous network level can be obtained as the second energy value corresponding to the previous network level.

The operation of determining the input information retention degree of the current component module according to the task quantity, the first energy value and the second energy value includes: obtaining the ratio between the first energy value and the second energy value of each target component module to obtain the energy ratio corresponding to each target component module; summing each energy ratio to obtain the sum of the energy ratio; and dividing the sum of the energy ratio by the task quantity to obtain the input information retention degree of the current component module.

In a specific application example, when the input task takes image classification as an example, if the input task of the neural network to be pruned includes at least one input task map, the output information of each component module corresponds to at least one output feature map. For the i-th component module of the t-th layer in the neural network to be pruned, assuming that the weight parameter of the i-th component module of the t-th layer in the network is $W_t^i$, the corresponding output feature map is denoted as $O_t^i(x)$, the energy ratio of each target component module is recorded as $B_t^i(x)$. The energy ratio $B_t^i(x)$ is averaged according to the number of tasks d input to the neural network to be pruned, to obtain the input information retention degree of the i-th component module of the t-th layer. The calculation formula is as follows.

$$B_t^i = \frac{1}{d}\sum B_t^i(x) = \frac{1}{d}\sum \frac{\|O_t^i(x)\|_2^2}{\sigma^2(O_{t-1}(x))} \quad (3)$$

$O_t^i(x)$ represents the output feature map of the i-th filter (network weight parameter is $W_t^i$) of the t-th layer in the network when the input task map is x.

$$\|O_t^i(x)\|_2^2$$

represents the square of the L2 norm of $O_t^i(x)$. $\sigma^2(O_{t-1}(x))$ represents the variance of all output feature maps of the (t−1) layer. $B_t^i(x)$ can be used to characterize the information acquisition capability of the i-th filter in the t-th layer of the neural network to be prune, the calculation formula is as follows:

$$\frac{\|O_t^i(x)\|_2^2}{\sigma^2(O_{t-1}(x))}.$$

The larger the calculated $B_t^i$, the stronger the information acquisition ability of the i-th filter in the t-th layer of the network for the input task, and the more important for the input task.

In this embodiment, the input information retention degree of the component module is determined according to the task quantity corresponding to the input task of the neural network to be pruned, the first energy value and the second energy value corresponding to the input task of the neural network to be pruned, such that it is possible to evaluate the input information retention of the component module according to the information flow between different network layers, to improve the accuracy of determining the input information retention degree of the component module, and then improve the accuracy of determining the importance index value of the current component module, and improve the accuracy of pruning.

Figure 5:
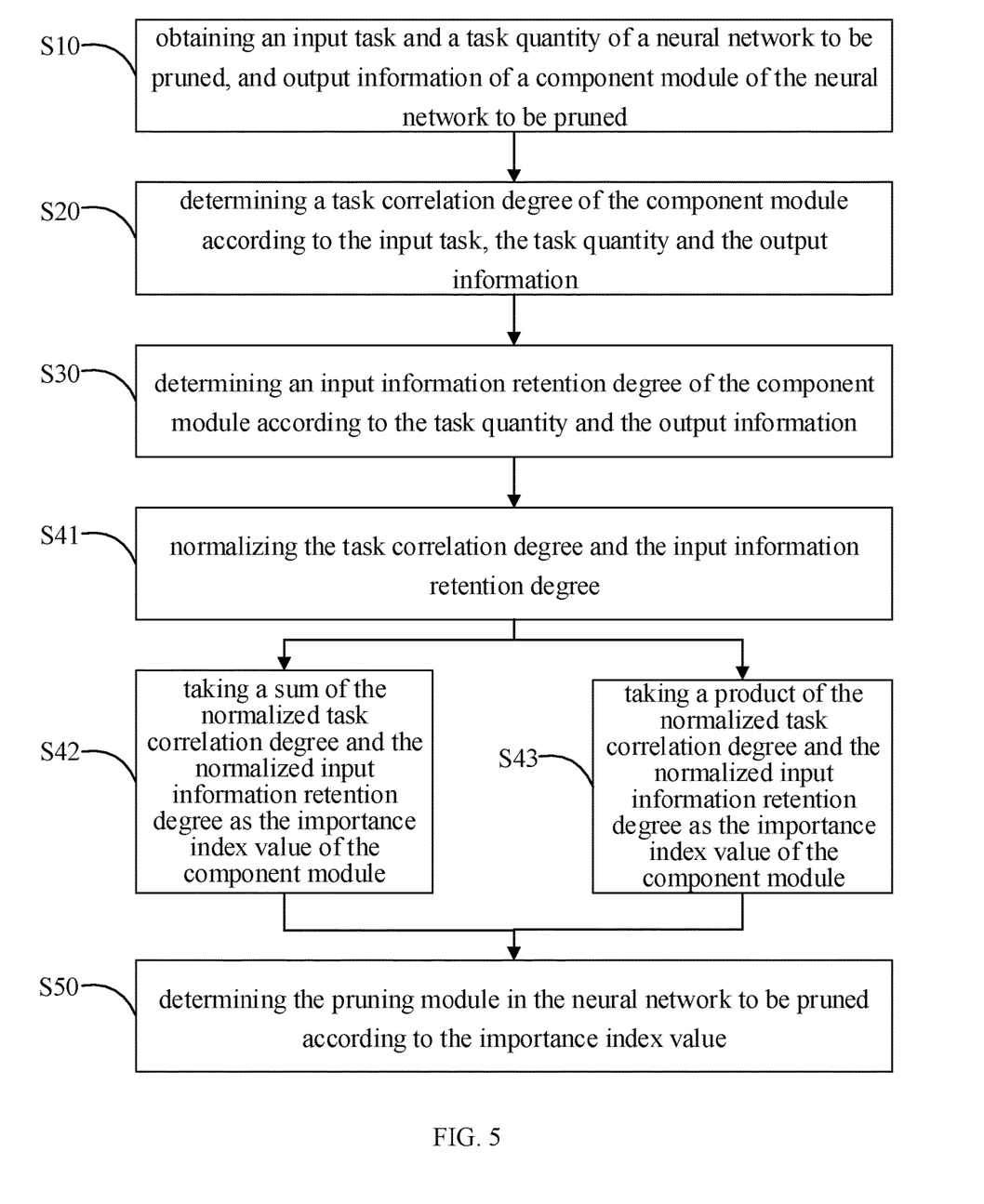
FIG. 5 is a schematic flowchart of the method for determining the task-driven pruning module according to a fourth embodiment of the present disclosure.

Based on the above first embodiment, a fourth embodiment of the method for determining the task-driven pruning module of the present disclosure is proposed. As shown in FIG. 5, in this embodiment, the operation S40 can include:
- Operation S41, normalizing the task correlation degree and the input information retention degree;
- Operation S42, taking a sum of the normalized task correlation degree and the normalized input information retention degree as the importance index value of the component module; or
- Operation S43, taking a product of the normalized task correlation degree and the normalized input information retention degree as the importance index value of the component module.

Since the importance of each component module in the neural network to be pruned is related to the task correlation degree and input information retention degree of each component module, the importance index value of each component module can be determined according to the task correlation degree and the input information retention degree, so as to evaluate the importance of each component module.

For example, the task correlation degree and input information retention degree of each component module can be summed, and the sum obtained by the summation can be used as the importance index value of each component module. Or, the product of the task correlation degree and the input information retention degree of each component module can be used as the importance index value of each component module. Or, after summing the task correlation degree and input information retention degree of each component module, and calculating the product of the task correlation degree and the input information retention degree of each component module, different weight values can be assigned to the obtained sums and products, the sums and products are weighted and summed with the assigned weight values, and the weighted sum obtained by the weighted summation is used as the importance index value of each component module.

In an embodiment, in order to unify the magnitude to reduce abnormal data interference, the task correlation degree and input information retention degree of each component module can be normalized first, the sum or product of the normalized task correlation degree and the input information retention degree is obtained as the importance index value of each component module. Specifically, it is possible to first obtain the maximum task correlation degree among the task correlation degrees of all component modules in the current network level, and the maximum input information retention degree among the input information retention degrees of all component modules in the current network level, then obtain the quotient between the task correlation degree and the maximum task correlation degree of the current component module to obtain the normalized task correlation degree, and obtain the quotient between the input information retention degree and the maximum input information retention degree of the current component module to obtain the input information retention degree after normalization processing. Thus, the importance index value of the corresponding component module can be obtained by summing the normalized task correlation degree and the normalized input information retention degree; or, the importance index value of the corresponding component module can be obtained by calculating the product of the normalized task correlation degree and the normalized input information retention degree.

In this embodiment, the importance index value of each component module is obtained by summing or multiplying the normalized task correlation degree and input information retention degree, such that the importance index value of each component module can be determined based on the task drive, to improve the accuracy of the importance index value, thereby improving the pruning accuracy of the neural network to be pruned.

In a specific application example, if the component module is a filter in the neural network to be pruned, the input information of the neural network to be pruned includes at least one input task map, and the output information of each component module includes the output feature map. The importance index value of each filter can be evaluated by evaluating the relevance between the input task and the output feature map (task correlation degree) and by measuring the information flow in the filter between adjacent network levels (input information retention degree). Then, the pruning module in the neural network to be pruned is determined according to the importance index value. The specific process is as follows:

1. Evaluating the Relevance Between the Input Task and the Feature Map (Task Correlation Degree).

Each filter can be regarded as a semantic extractor related to the input task, and the output feature map of the filter can be regarded as a feature map containing the semantic information of the input task. The relationship between the input task and the feature map is evaluated by determining how much semantic information related to the input task is contained in the output feature map, to determine the semantic extraction ability of the filter outputting the output feature map to the input task. This ability is used as an index to evaluate the importance of the filter.

Assuming that the input task map is x, the grayscale map $G(x)$ is obtained. The input task map is input into the neural network to be pruned. Assuming that the network weight parameter of the i-th filter in the t-th layer of the neural network to be pruned is $W_t^i$, the corresponding output feature map can be denoted as $O_t^i(x)$. Then, the output feature map is expanded to an image with the same resolution as the input task map by bilinear interpolation, and based on the preset threshold, the binarization operation of $G(x)$ and $\tilde{O}_t^i(x)$ is realized by the following formula (1):

$$L(x):=G(x)>\Delta, M_t^i(x):=\tilde{O}_t^i(x)>\Delta \qquad (1)$$

$L(x)$ and $M_t^i(x)$ are the results obtained after binarizing $G(x)$ and $\tilde{O}_t^i(x)$ respectively. Different values of the threshold $\Delta$ have no effect on the finally determined importance index value.

Assuming that the importance quantification score (task retention ratio) of the i-th filter in the t-th layer of the neural network to be pruned is $A_t^i(x)$, then the $A_t^i(x)$ obtained from all input tasks can be averaged to obtain the final importance quantification score (task correlation degree) $A_t^i$ of the i-th filter in the t-th layer. $A_t^i$ corresponds to the semantic extraction ability of the filter corresponding to the current output feature map to the input task, and can be used to represent the connection between the input task and the output feature map. The specific calculation process is shown in formula (2):

$$A_t^i = \frac{1}{d}\sum A_t^i(x) = \frac{1}{d}\sum \frac{L(x) \cap M_t^i(x)}{L(x) \cup M_t^i(x)} \qquad (2)$$

d represents the number of input task maps in the input task, that is, the number of tasks, and $A_t^i(x)$ can be obtained by calculating the connection between the input task and the output feature map. The specific calculation process is to obtain the ratio of the intersection and union of $L(x)$ and $M_t^i(x)$. That is, $$A_t^i(x) = \frac{L(x) \cap M_t^i(x)}{L(x) \cup M_t^i(x)}.$$

The larger the calculated $A_t^i$, the stronger the ability of the i-th filter in the t-th layer to extract the semantic information of the input task, and the more important for the input task.

2. Determining Information Flow in Filters Between Adjacent Layers (Input Information Retention Degree)

During the process of forward inference in the neural network to be pruned, the information flow in the input task will flow between adjacent layers layer by layer from shallow layer to deep layer. For a filter of a specific layer, it will input the output feature map of the previous layer and output the output feature map of the current layer, which means that the filters between the layers have no influence on each other. Therefore, the filter of each layer can be regarded as a finite state machine, and the information flow in the filter between adjacent layers can be measured by analyzing the amount of information acquired between the filters of adjacent layers.

Specifically, assuming that when the input task map is x, the importance quantization score (energy ratio) of the i-th filter in the t-th layer of the neural network to be pruned is $B_t^i(x)$, averaging $B_t^i(x)$ obtained from all input tasks can obtain the importance quantization score (input information retention degree) $B_t^i$ of the i-th filter in the final t-th layer, to characterize the information acquisition ability of the i-th filter in the t-th layer of the pruned neural network. The specific calculation process is shown in formula (3):

$$B_t^i = \frac{1}{d}\sum B_t^i(x) = \frac{1}{d}\sum \frac{\|O_t^i(x)\|_2^2}{\sigma^2(O_{t-1}(x))} \quad (3)$$

$O_t^i(x)$ represents the output feature map of the i-th filter (network weight parameter is $W_t^i$) of the t-th layer in the network when the input task map is x.

$$\|O_t^i(x)\|_2^2$$

represents the square of the L2 norm of $O_t^i(x)$. $\sigma^2(O_{t-1}(x))$ represents the variance of all output feature maps of the (t−1) layer. $B_t^i(x)$ can be used to characterize the information acquisition capability of the i-th filter in the t-th layer of the neural network to be prune, the calculation formula is as follows:

$$\frac{\|O_t^i(x)\|_2^2}{\sigma^2(O_{t-1}(x))}.$$

The larger the calculated $B_t^i$, the stronger the information acquisition ability of the i-th filter in the t-th layer of the network for the input task, and the more important for the input task.

3. Combining to Obtain the Final Task-Driven Importance Assessment Strategy

The $A_t^i$ and $B_t^i$ obtained above can be combined to calculate the importance index value of each filter, as shown in formula (4):

$$\Gamma_t^i = \frac{A_t^i}{\max(A_t)} + \frac{B_t^i}{\max(B_t)} \text{ or } \Gamma_t^i = \frac{A_t^i}{\max(A_t)} \times \frac{B_t^i}{\max(B_t)} \quad (4)$$

$\max(A_t)$ and $\max(B_t)$ respectively represent the maximum value in $A_t=\{A_t^i, 1\leq i\leq n_t\}$ and the maximum value in $B_t=\{B_t^i, 1\leq i\leq n_t\}$ of all filters in the t-th layer of the neural network to be pruned, $n_t$ is the number of filters in the t-th layer of the network.

In order to verify the performance of the present disclosure, at least four typical neural networks, such as VGG-16, ResNet-56, ResNet-110, ResNet-50, are used as the neural network to be pruned, the network model pruning test is performed based on two test datasets, CIFAR-10 and ImageNet (ILSVRC2012). The experimental results show that the task-driven pruning scheme proposed in the present disclosure, compared with data-driven pruning schemes, achieves better network pruning performance, including higher compression ratio, less parameter storage requirements and lower computational complexity.

That is, the two combined calculation schemes for the above importance index values can achieve good results and can be selected and used according to specific conditions.

4. Training Framework

Assuming that the loss function of the task is as shown in formula (5):

$$\mathcal{L}_{task=\Sigma} \ell_{f(x,W),y} \quad (5)$$

f(x, W) is the output of the network, and $\ell(.)$ is the loss function calculation formula of each input training example x (can be the formula of cross entropy loss or other specific calculation). y is the ground truth corresponding to the training example x.

The specific process of pruning is as follows: assuming that the pruning rate of the t-th layer in the network is preset as $r_t$, after obtaining the importance index value of each filter in the t-th layer $\Gamma_t=\{\Gamma_t^i, 1\leq i\leq n_t\}$ ($n_t$ is the number of filters in the t-th layer of the network). By $r_t$, the filter with smaller importance quantization score in the t-th layer is removed and the filter with larger importance quantization scores is retained to realize pruning. For example, if the sparsity of the t-th layer is preset to $r_t$=0.1, 10% of the filters of the t-th layer will be retained, and the remaining 90% of the filters will be removed by pruning. At this time, according to the importance index value $\Gamma_t$ of each filter in the t-th layer, the first 10% of the filters with the largest $\Gamma_t^i$ value are retained, and the remaining filters are removed to finally realize the pruning of the t-th layer in the neural network to be pruned.

The specific training framework is as follows:
1) Input: training data pair (x, y), pre-training the model parameter $W=\{W_t, 1\leq t\leq T\}$ (T is the number of layers in the neural network to be pruned), the preset network pruning rate $r=\{r_t, 1\leq t\leq T\}$, the learning rate $\eta$, the number of training iterations j, and the training stop condition $\epsilon$.
2) Output: the final pruned network model parameter $\tilde{W}=\{\tilde{W}_t, 1\leq t\leq T\}$.
Calculate the task-driven importance index value $\Gamma=\{\Gamma_t, 1\leq t\leq T\}$ in the neural network to be pruned by the above formulas (1)~(4);
3) Let $\tilde{W}=W$;
4) Perform layer-by-layer pruning of the neural network to be pruned through $\Gamma$ and r;
5) When $$\left\|\tilde{W}^j - \tilde{W}^{j-1}\right\|_2 > \epsilon, \tilde{W}^{j+1} = \tilde{W}^{j+1} - \eta \cdot \frac{\partial \mathcal{L}_{task}}{\partial \tilde{W}^{j+1}},$$

6) Output the pruned network model parameter $\tilde{W}$.

It should be noted that step 3 is the process of pruning based on the task-driven neural network model. Steps 4-5 are the process of retraining and fine-tuning. $\|\tilde{W}^j-\tilde{W}_{j-1}\|_2$ represents the L2 norm value of the difference between the pruned model parameter $\tilde{W}_j$ obtained when the number of training iterations is j times and the pruned model parameter $\tilde{W}^{j-1}$ obtained when the number of training iterations is (j−1) times. When $\|\tilde{W}^j-\tilde{W}^{j-1}\|_2>\epsilon$, iterative retraining and fine-tuning of the pruned network model parameters will continue.

Besides, the present disclosure further provides a device for determining a task-driven pruning module, including a memory, a processor, and a program for determining the task-driven pruning module stored in the memory and executable on the processor, and when the program is executed by the processor, the operations of the method for determining the task-driven pruning module described above are implemented.

Besides, the present disclosure further provides a computer readable storage medium, a program for determining a task-driven pruning module is stored in the computer readable storage medium, and when the program is executed by a processor, the operations of the method for determining the task-driven pruning module described above are implemented.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (such as a mobile phone, a computer, a server, or a network device, or the like) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for determining a task-driven pruning module, applied to a device for determining the task-driven pruning module, wherein the device comprises a communication bus, a processor, a user interface, a network interface, and a memory; the communication bus is configured to implement communication between the processor, the user interface, the network interface, and the memory; the network interface is configured to connect to a background server and perform data communication with the background server; the user interface is configured to connect to a client and perform data communication with the client; the processor is perform operations of the method for determining the task-driven pruning module;

the method for determining the task-driven pruning module comprises following operations:

obtaining an input task and a task quantity of a neural network to be pruned, and output information of a component module of the neural network to be pruned;

determining a task correlation degree of the component module according to the input task, the task quantity and the output information;

determining an input information retention degree of the component module according to the task quantity and the output information;

determining an importance index value of the component module according to the task correlation degree and the input information retention degree; and determining the pruning module in the neural network to be pruned according to the importance index value;

wherein the operation of determining an importance index value of the component module according to the task correlation degree and the input information retention degree comprises:

normalizing the task correlation degree and the input information retention degree;

taking a sum of the normalized task correlation degree and the normalized input information retention degree as the importance index value of the component module; or taking a product of the normalized task correlation degree and the normalized input information retention degree as the importance index value of the component module, wherein the component module is a filter in the neural network to be pruned.

2. The method of claim 1, wherein the operation of determining a task correlation degree of the component module according to the input task, the task quantity and the output information comprises:

obtaining a target serial number of the component module in a current network level;

determining a target component module whose serial number is less than or equal to the target serial number in the current network level;

determining an input task retention degree and a sum of input and output information of each target component module according to output information of each target component module and the input task; and determining the task correlation degree of the component module according to the task quantity, the input task retention degree and the sum of the input and output information.

3. The method of claim 2, wherein the input task comprises at least one input task map, the output information comprises an output feature map, and the operation of determining an input task retention degree and a sum of input and output information of each target component module according to output information of each target component module and the input task comprises:

adjusting a resolution of the output feature map of each target component module, so that the resolution of the output feature map is consistent with a resolution of the input task map;

binarizing the input task map and the adjusted output feature map;

obtaining the input task retention degree of each target component module through taking an intersection of the processed input task map and the processed output feature map; and obtaining the sum of the input and output information of each target component module through taking a union of the processed input task map and the processed output feature map.

4. The method of claim 2, wherein the operation of determining the task correlation degree of the component module according to the task quantity, the input task retention degree and the sum of the input and output information comprises:
- obtaining a ratio of the input task retention degree and the sum of the input and output information, and obtaining a task retention ratio of each target component module;
- summing each task retention ratio to obtain a sum of the task retention ratio; and
- determining a quotient of the sum of the task retention ratio and the task quantity as the task correlation degree of the component module.

5. The method of claim 1, wherein the operation of determining an input information retention degree of the component module according to the task quantity and the output information comprises:
- obtaining a target serial number of the component module in a current network level, and an image quantity in the input task;
- determining a target component module whose serial number is less than or equal to the target serial number in the current network level;
- determining a first energy value of each target component module in the current network level according to output information of each target component module, and determining a second energy value of the component module in a previous network level according to output information of each component module in the previous network level; and
- determining the input information retention degree of the component module according to the task quantity, the first energy value and the second energy value.

6. The method of claim 5, wherein the operation of determining a first energy value of each target component module in the current network level according to output information of each target component module, and determining a second energy value of the component module in a previous network level according to output information of each component module in the previous network level comprises:
- obtaining a norm of the output information of each target component module, and using a square of the norm as the first energy value of each target component module; and
- obtaining a variance of the output information of each component module in the previous network level to obtain the second energy value.

7. The method of claim 5, wherein the operation of determining the input information retention degree of the component module according to the task quantity, the first energy value and the second energy value comprises:
- obtaining a ratio of each first energy value and each second energy value, and obtaining an energy ratio corresponding to each target component module;
- summing each energy ratio to obtain a sum of the energy ratio; and
- determining a quotient of the sum of the energy ratio and the task quantity as the input information retention degree of the component module.

8. A non-transitory computer readable storage medium, wherein a program for determining a task-driven pruning module is stored in the non-transitory computer readable storage medium, and when the program is executed by a processor, the operations of the method for determining the task-driven pruning module according to claim 1 are implemented.

* * * * *